United States Patent
Dodd et al.

(10) Patent No.: US 7,404,047 B2
(45) Date of Patent: Jul. 22, 2008

(54) METHOD AND APPARATUS TO IMPROVE MULTI-CPU SYSTEM PERFORMANCE FOR ACCESSES TO MEMORY

(75) Inventors: James M. Dodd, Shingle Springs, CA (US); Robert Milstrey, Citrus Heights, CA (US)

(73) Assignee: Intel Corporation, Santa Clara, CA (US)

( * ) Notice: Subject to any disclaimer, the term of this patent is extended or adjusted under 35 U.S.C. 154(b) by 391 days.

(21) Appl. No.: 10/446,986

(22) Filed: May 27, 2003

(65) Prior Publication Data

US 2004/0243768 A1 Dec. 2, 2004

(51) Int. Cl.
*G06F 13/14* (2006.01)
(52) U.S. Cl. .................. 711/147; 711/146; 711/141; 711/5
(58) Field of Classification Search .................. None
See application file for complete search history.

(56) References Cited

U.S. PATENT DOCUMENTS

| | | | |
|---|---|---|---|
| 5,822,772 A | 10/1998 | Chan et al. | |
| 5,850,534 A * | 12/1998 | Kranich | 711/144 |
| 5,983,325 A | 11/1999 | Lewchuk | |
| 6,088,772 A | 7/2000 | Harriman et al. | |
| 6,484,238 B1 | 11/2002 | Cutter | |
| 7,127,573 B1 * | 10/2006 | Strongin et al. | 711/158 |
| 2004/0123067 A1 | 6/2004 | Sprangle et al. | |

FOREIGN PATENT DOCUMENTS

CA 2239426 3/1998

OTHER PUBLICATIONS

Examination Report from GB Application No. GB0521374.9, mailed Feb. 22, 2006, 11 pgs.
PCT Search Report Dec. 13, 2004.
* cited by examiner

*Primary Examiner*—B. James Peikari
(74) *Attorney, Agent, or Firm*—Blakely, Sokoloff, Taylor & Zafman LLP

(57) ABSTRACT

Methods and apparatuses for improving processor performance in a multi-processor system by optimizing accesses to memory. Processors can track the state of a memory such that the memory can be efficiently utilized in a multi-processor system including the ability to decode incoming snoop addresses from other processors, comparing them to contents of a memory tracking register(s), and updating tracking register(s) appropriately. Likewise, the transactions from other non-processor bus agents and/or bus mastering devices, such as a bus bridge, memory controller, Input/output (I/O), and graphics could also be tracked.

12 Claims, 4 Drawing Sheets

METHOD AND APPARATUS TO IMPROVE MULTI-CPU SYSTEM PERFORMANCE FOR ACCESSES TO MEMORY

RELATED APPLICATION

This application is related to application Ser. No. 10/328,576 entitled "A Method and Apparatus for determining a dynamic random access memory page management implementation"", now issued as U.S. Pat No. 7,020,762, with inventors E. Sprangle and A. Rohillah, filed Dec. 24, 2002 and assigned to the assignee of the present application.

BACKGROUND

1. Field

The present disclosure pertains to the field of microprocessor systems and more specifically to microprocessor systems capable of operating with memory controller over a system bus.

2. Description of Related Art

Dynamic Random Access Memories (DRAMs) may have memory precharge, activate, read, and write operations. In particular, a memory controller that addresses a bank of memory must first precharge the memory bank, then the addressed page within the bank must be activated before the addressed column in that page is accessed (read or written). Accesses to an open DRAM page (a "page hit") indicates the memory being accessed has already been precharged and activated. Data may be read to or written from the DRAM page without having to precharge or activate the memory during each memory access. When a "page miss" occurs (i.e., data is accessed from a page in memory other than from the page that is open), the currently-open page must be closed (i.e., written back to the DRAM chip from the sense amps) before the new memory page can be precharged and activated to enable accessing. Writing the old page to DRAM and precharging and activating the new DRAM pages takes time and memory command bus bandwidth, which in turn increases the access latency of the memory access, resulting in an inefficient use of the memory bus (reduced bandwidth utilization) and a loss in performance of an apparatus (e.g., a computer) employing DRAM.

BRIEF DESCRIPTION OF THE FIGURES

The present invention is illustrated by way of example and not limitation in the Figures of the accompanying drawings.

DETAILED DESCRIPTION

The following description provides methods for improving CPU performance in a multi-CPU system by optimizing accesses to memory. In the following description, numerous specific details are set forth in order to provide a more thorough understanding of the present invention. It will be appreciated, however, by one skilled in the art that the invention may be practiced without such specific details. Those of ordinary skill in the art, with the included descriptions, will be able to implement appropriate logic circuits without undue experimentation.

Various embodiments disclosed may allow CPUs to track the state of a memory such that said memory, such as a DRAM, can be efficiently utilized in a multi-CPU system. For example, the claimed subject matter facilitates the ability for decoding incoming snoop addresses from other CPUs, comparing them to contents of a DRAM tracking register(s), and updating said tracking register(s) appropriately. Likewise, the transactions from other non-CPU bus-agents and/or bus mastering devices, such as a bus bridge, memory controller, Input/Output (I/O), and graphics could also be tracked without requiring additional pins or protocols. As previously described, the DRAM tracking logic has been disclosed in the related application from E. Sprangle and A. Rohillah.

Thus, the CPU can track the status of the DRAM accesses and the particular pages that are open. Therefore, the claimed subject matter improves CPU performance by optimizing accesses to DRAM memory because the CPU will reorder transactions to efficiently utilize DRAM pages that are currently open.

The term "DRAM" is used loosely in this disclosure as many modern variants of the traditional DRAM memory are now available. The techniques disclosed and hence the scope of this disclosure and claims are not strictly limited to any specific type of memory, although single transistor, dynamic capacitive memory cells may be used in some embodiments to provide a high density memory array. Various memories arrays which allow piece-wise specification of the ultimate address may benefit from certain disclosed embodiments, regardless of the exact composition of the memory cells, the sense amplifiers, any output latches, and the particular output multiplexers used.

Figure 1:
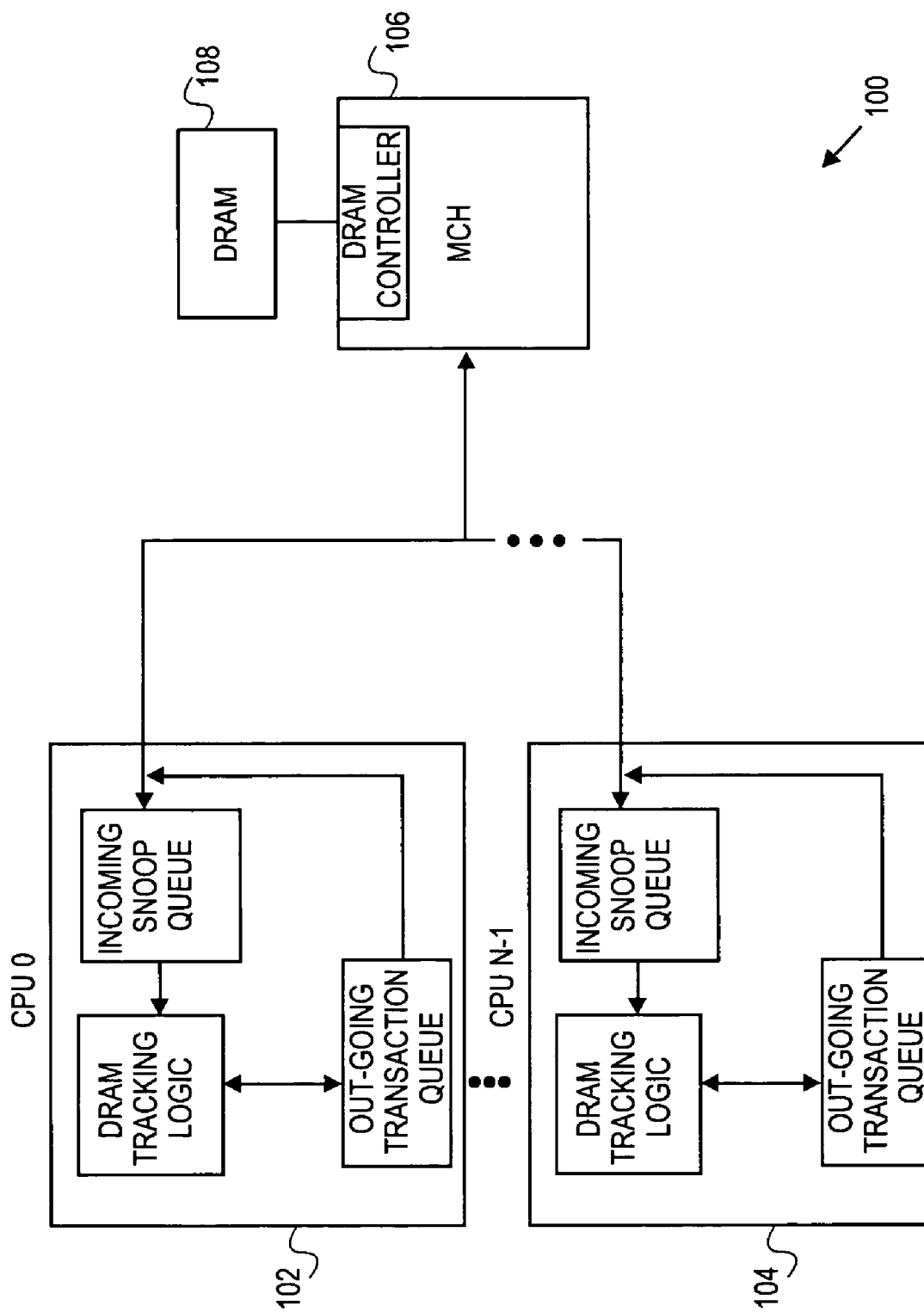
FIG. 1 illustrates a high-level schematic of an N number of CPUs to be coupled as to allow for tracking of the page status of DRAM memory(ies) that may be utilized in an embodiment.

FIG. 1 illustrates an apparatus utilized in an embodiment. The apparatus depicts a high-level schematic of an N number of CPUs to be coupled as to allow for tracking of the page status of DRAM memory(ies). In one embodiment, the apparatus is a system with multiple processors 102 and 104 that are coupled to DRAM memory 108 via a memory controller hub (MCH) 106. In the same embodiment, each processor 102 and 104 has a plurality of DRAM tracking registers.

However, the claimed subject matter is not limited to two processors. Rather, FIG. 1 just illustrates one example of a multiprocessor shared-bus configuration. Alternatively, one could utilize three or four microprocessors in a similar shared-bus configuration. In addition, the claimed subject matter is not limited to processors in a shared-bus configuration. One could utilize multiple processors in an independent-bus configuration, wherein a plurality of tracking registers would be incorporated into a snoop filter logic. These tracking registers would generate a dummy snoop to each processor to force the processors implementing this invention to update their tracking registers. In alternative embodiments, the processors may be utilized in other configurations, such as a switching fabric or a point-to-point.

Each processor, designated as 102 and 104, comprises one or more DRAM tracking registers to track which DRAM memory pages are open in each bank and rank. For example, the CPU decodes an address for outgoing transactions from the out-going transaction queue and the DRAM tracking logic facilitates the loading of the particular page address into an appropriate tracking register. Thus, the contents of the tracking registers indicate which pages are open in the particular DRAM bank. Furthermore, the CPU then may reorder transactions to increase the possibility of a page-hit by accessing pages that are tracked as open.

Figure 2:
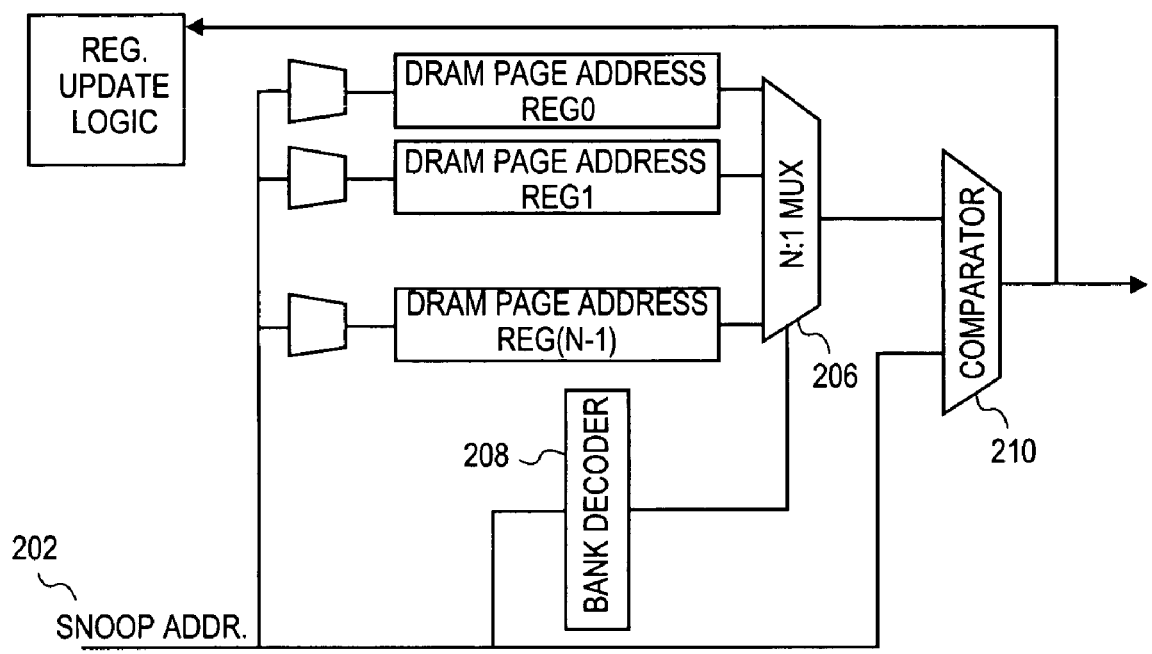
FIG. 2 illustrates a schematic of logic utilized in conjunction with the memory tracking logic depicted in connection with FIG. 1 that may be utilized in an embodiment.

FIG. 2 illustrates an apparatus in accordance with one embodiment. In one embodiment, the apparatus depicts a schematic of a logic utilized in conjunction with the DRAM tracking logic depicted in connection with FIG. 1.

In one embodiment, the apparatus is incorporated within each CPU as discussed in connection with FIG. 1. From the perspective of one CPU, the apparatus receives at least one snoop address 202 from other CPUs and agents to allow for decoding the snoop address and comparing to a plurality of DRAM tracking registers 204. The CPU will use the result of the tracking register comparison to update the contents of the tracking register. Based on the status of the open pages in the DRAM, a CPU may reorder the transactions to take advantage of the open pages and increase the likelihood of a page hit. In contrast, since a page-miss degrades performance as the CPU waits for the page-miss condition to be resolved a CPU may reorder the transactions to deprioritize page-miss transactions to decrease the likelihood of a page miss.

The bank decoder 208 decodes the snoop address 202 to determine the particular DRAM bank the CPU is accessing. The multiplexer 206 selects the particular tracking register 204 based at least in part on the decoded bank information from the bank decoder and forwards the contents of the particular tracking register to a comparator 210.

A plurality of page-address bits of the snoop addresses is compared against the contents of the particular tracking register by the comparator 210. In the event of NO MATCH, this indicates the other CPU or bus-agent is accessing a different DRAM page, which will close the page that is currently open and open a new page defined by the snoop address. Also, the CPU with the snoop address will reload the contents of the tracking register with the snoop address. Therefore, the CPU utilized the snoop address information from the other CPU and agents in conjunction with its own outgoing transactions for comparing and updating its own DRAM tracking register (s) 204.

Figure 3:
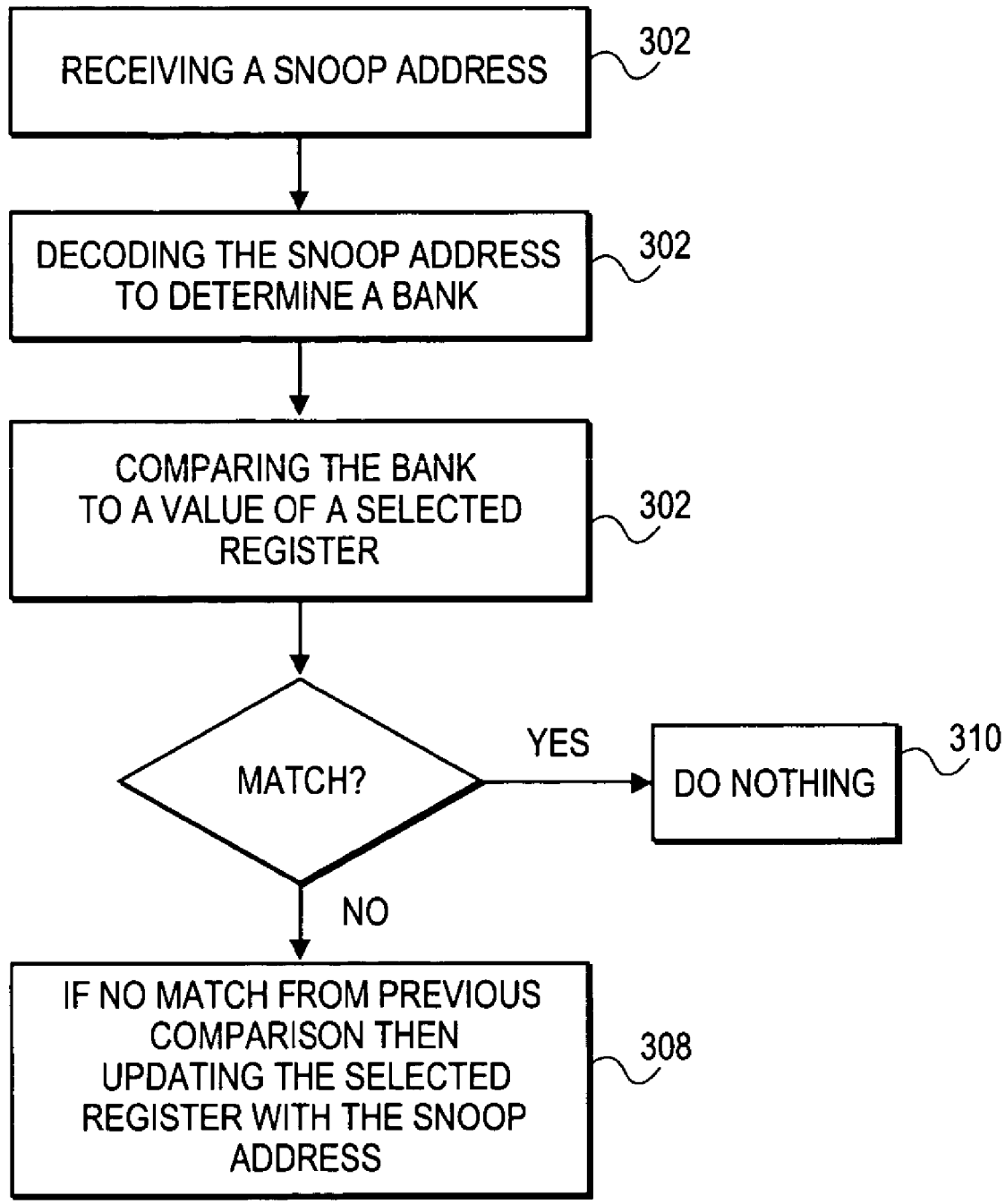
FIG. 3 illustrates a method of operation of memory tracking logic utilized in an embodiment.

FIG. 3 illustrates a method in accordance with an embodiment. The method incorporates a first CPU receiving a snoop address from a second CPU or agent, as depicted by a block 302. The first CPU to decode the snoop address to determine the appropriate DRAM bank, as depicted by a block 304. The first CPU to select a register based at least in part on the bank information. Subsequently, the first CPU to compare the bank information to the content of the selected register, as depicted by a block 306 In the event of NO MATCH, the first CPU to update the contents of the selected register with the value of the snoop address, as depicted by a block 308. The CPU will take no actions in the event of a MATCH, as depicted by a block 310.

Figure 4:
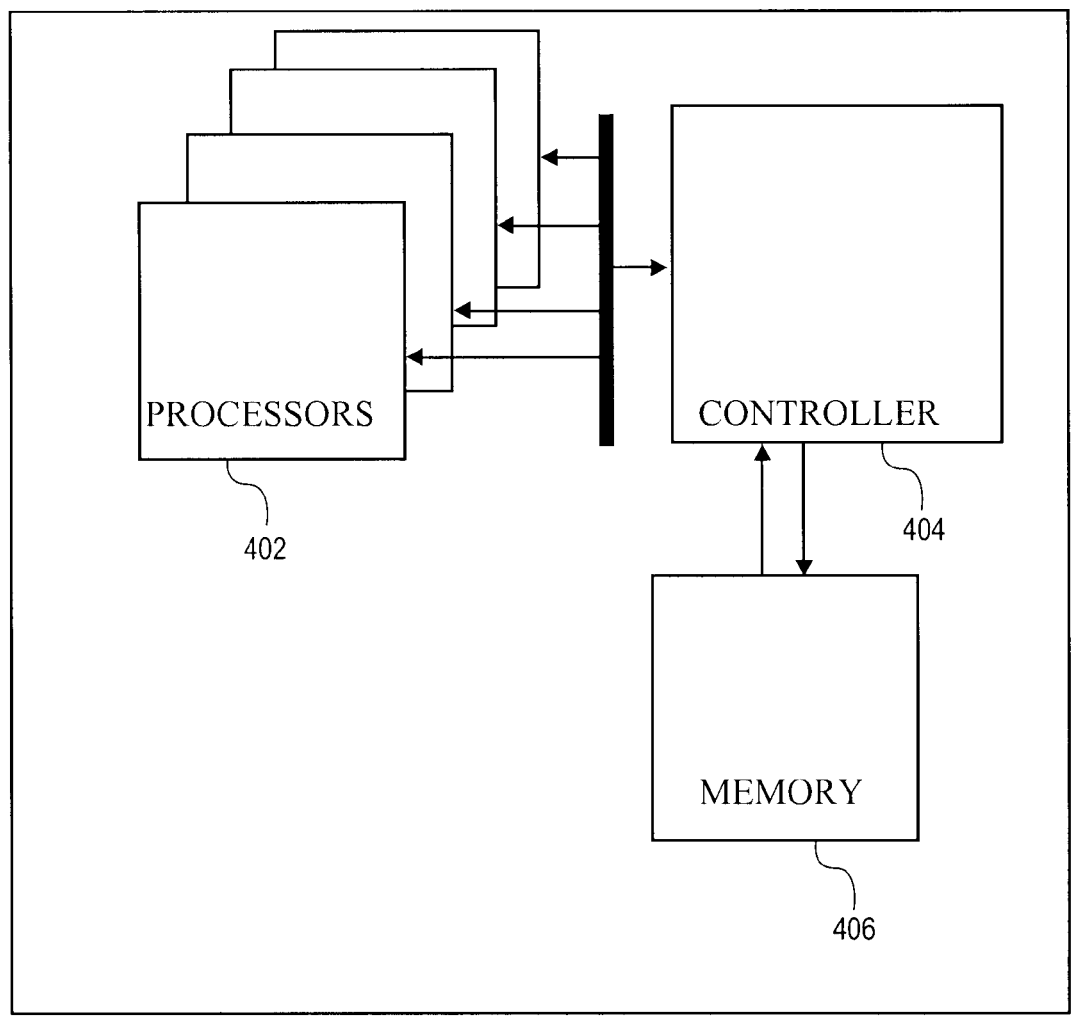
FIG. 4 illustrates a plurality of processors that incorporate a memory controller that is coupled to a memory that may be utilized in an embodiment.

FIG. 4 depicts an apparatus in accordance with one embodiment. The apparatus in one embodiment is a plurality of processors 402 that incorporates a memory controller 404 that is coupled to a memory 406. For example, the processor incorporates a memory controller by allowing the processor to perform memory controller functions, thus, the processor performs memory controller functions In contrast, in another embodiment, the processors 402 are coupled to a memory controller 404 that is coupled to a memory 406 and the processor does not perform memory controller functions. In both previous embodiments, the apparatus comprises the previous embodiments depicted in FIGS. 1-3 of the specification. Also, in one embodiment, the apparatus is a system.

Also, the memory may be a synchronous DRAM (SDRAM), a Rambus DRAM (RDRAM), a double data rate DRAM (DDR DRAM), a static random access memory (SRAM), or any memory that utilizes at least two accesses to generate a complete address for the memory. For example, in one embodiment, a SRAM may be utilized with several memory chips that are routed through a single multiplexer.

While certain exemplary embodiments have been described and shown in the accompanying drawings, it is to be understood that such embodiments are merely illustrative of and not restrictive on the broad invention, and that this invention not be limited to the specific constructions and arrangements, shown and described, since various other modifications may occur to those ordinarily skilled in the art upon studying this disclosure.

What is claimed is:

1. An apparatus comprising:
   at least one memory with a plurality of memory banks, coupled to a configuration of bus agents, each bus agent having snoop filter logic including a plurality of tracking registers that selectively generate a dummy snoop to cause other bus agents to update their tracking registers;
   at least one of the bus agents to reorder a memory transaction to the memory based at least in part on a page open status of the plurality of memory banks.

2. The apparatus of claim 1 wherein the configuration comprises a shared-bus configuration.

3. The apparatus of claim 1 wherein the configuration comprises an independent-bus configuration.

4. The apparatus of claim 1 wherein the configuration comprises a switching fabric configuration.

5. The apparatus of claim 1 wherein the configuration comprises a point-to-point configuration.

6. The apparatus of claim 1 wherein the memory comprises a dynamic access random memory (DRAM).

7. The apparatus of claim 1 wherein the page open status of the plurality of memory banks is based on other memory transactions from the configuration of bus agents.

8. The apparatus of claim 7 wherein the page open status of each memory bank is stored in one of a plurality of tracking registers within at least one of the bus agents.

9. The apparatus of claim 8 wherein the bus agents are either: a processor, a bus bridge, a memory controller, an Input/Output device (I/O device), or a graphics module.

10. The apparatus of claim 7 wherein the page open status of a memory bank is calculated by a decoder within each one of the bus agents that receives and decodes incoming snoop addresses from the other bus agents to determine the particular memory bank and to compare the status of the particular memory bank of the incoming snoop address to the status of one of the tracking registers based on the decoded bank.

11. A method comprising:
    receiving a first and second memory transaction;
    reordering a first and second memory transaction based on a page open status of a memory bank as determined by decoding an incoming snoop address and comparing the incoming snoop address to a value maintained in a tracking register of a snoop filter logic of a bus agent, wherein the tracking register selectively generates a dummy snoop to cause other bus agents to update their tracking registers.

12. The method of claim 11 wherein reordering the second memory transaction to be processed before the first memory transaction when the second memory transaction is for a memory bank with an open status and the first memory transaction is for a memory bank with a closed status.

* * * * *